United States Patent
Perotti et al.

(10) Patent No.: US 7,841,771 B2
(45) Date of Patent: Nov. 30, 2010

(54) SELF-VALIDATING THERMOCOUPLE

(75) Inventors: Jose M. Perotti, Merritt Island, FL (US); Carlos T. Mata, Titusville, FL (US); Josephine B. Santiago, Orlando, FL (US); Peter Vokrot, Orlando, FL (US); Carlos E. Zavala, Orlando, FL (US); Bradley M. Burns, Titusville, FL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 515 days.

(21) Appl. No.: 11/777,711

(22) Filed: Jul. 13, 2007

(65) Prior Publication Data

US 2008/0013598 A1    Jan. 17, 2008

Related U.S. Application Data

(60) Provisional application No. 60/807,217, filed on Jul. 13, 2006.

(51) Int. Cl.
*G01K 7/00* (2006.01)
(52) U.S. Cl. .................. 374/179; 374/183; 374/170; 374/181
(58) Field of Classification Search ............ 374/179, 374/183, 170, 181
See application file for complete search history.

(56) References Cited

U.S. PATENT DOCUMENTS

| | | | | | |
|---|---|---|---|---|---|
| 5,709,470 | A | * | 1/1998 | Finley | 374/16 |
| 5,887,978 | A | * | 3/1999 | Lunghofer et al. | 374/179 |
| 5,929,438 | A | * | 7/1999 | Suzuki et al. | 850/50 |
| 6,692,145 | B2 | * | 2/2004 | Gianchandani et al. | 374/185 |
| 2007/0209977 | A1 | * | 9/2007 | Wilf et al. | 210/85 |

OTHER PUBLICATIONS

Thermocouples—A Quick Guide, AZoM.*

* cited by examiner

*Primary Examiner*—Lisa M Caputo
*Assistant Examiner*—Mirellys Jagan
(74) *Attorney, Agent, or Firm*—Randall M. Heald; Thomas W. Leffert

(57) ABSTRACT

Self-Validating Thermocouple (SVT) Systems capable of detecting sensor probe open circuits, short circuits, and unnoticeable faults such as a probe debonding and probe degradation are useful in the measurement of temperatures. SVT Systems provide such capabilities by incorporating a heating or excitation element into the measuring junction of the thermocouple. By heating the measuring junction and observing the decay time for the detected DC voltage signal, it is possible to indicate whether the thermocouple is bonded or debonded. A change in the thermal transfer function of the thermocouple system causes a change in the rise and decay times of the thermocouple output. Incorporation of the excitation element does not interfere with normal thermocouple operation, thus further allowing traditional validation procedures as well.

19 Claims, 5 Drawing Sheets

SELF-VALIDATING THERMOCOUPLE

CROSS-REFERENCE TO RELATED APPLICATION

The application claims the benefit, under 35 U.S.C. §119(e), of U.S. Provisional Application Ser. No. 60/807,217 filed Jul. 13, 2006, the contents of which are incorporated herein by reference.

ORIGIN OF THE INVENTION

The invention described herein was made in the performance of work under a NASA contract and by employees of the United States Government and is subject to the provisions of Public Law 96-517 (35 U.S.C. §202) and may be manufactured and used by or for the Government for governmental purposes without the payment of any royalties thereon or therefor. In accordance with 35 U.S.C. §202, the contractor elected not to retain title.

TECHNICAL FIELD OF THE INVENTION

The present invention relates generally to thermocouples and in particular to the thermocouple designs capable of self validation.

BACKGROUND OF THE INVENTION

The basic concept of a sensor automatically monitoring its operational capability, i.e., self-validating performance, is generally recognized. An attempt is made to continuously monitor and self-validate the sensor's performance to determine the health of the sensor. The process of self-validation involves the continued assessment of a combination of: 1) reviewing physical parameters obtained real-time by means of electronic circuitry to obtain actual measurement data; and 2) utilizing a combination of statistical tools to estimate and predict a measurement value at a given time in the process and compare the predicted measurement value to the actual measurement data. Self-validation processes used by others include ARMA (Auto Regression Moving Average), LCSR (Loop Current Step Response), and Power Spectrum Density determination. The failure or success of any of these processes presupposes properly functioning sensor circuitry.

However, in many sensors, and particular thermocouples, the actual cause for failure is directly related to the physical bonding between the thermocouple sensor element and the attachment surface. As a consequence, conventional self-validating techniques may fail to reliably identify the bonded/debonded condition that directly leads to sensor failure.

For the reasons stated above, and for other reasons that will become apparent to those skilled in the art upon reading and understanding the present specification, there is a need in the art for alternative approaches to thermocouple validation.

SUMMARY OF THE INVENTION

The various embodiments provide a Self-Validating Thermocouple (SVT) System capable of detecting sensor probe open circuits, short circuits, and unnoticeable faults such as a probe debonding and probe degradation. The various embodiments provide such capabilities by incorporating a heating or excitation element into the measuring junction of the thermocouple. By heating the measuring junction and observing the decay time for the detected DC voltage signal, it is possible to indicate whether the thermocouple is bonded or debonded. A change in the thermal transfer function of the thermocouple system causes a change in the decay time for the DC voltage signal. The various embodiments are further capable of traditional validation procedures as the excitation elements in accordance with the various embodiments do not interfere with the normal operation of the thermocouple.

The invention includes methods and apparatus of varying scope.

DETAILED DESCRIPTION OF THE INVENTION

In the following detailed description of the preferred embodiments, reference is made to the accompanying drawings that form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that process, mechanical, and electrical changes may be made without departing from the spirit and scope of the present invention. It is noted that the drawings are not to scale unless a scale is provided thereon. The following detailed description is, therefore, not to be taken in a limiting sense, and the scope of the present invention is defined only by the appended claims and equivalents thereof.

It is well known that a metal or other conductor subjected to a thermal gradient will generate a voltage. To measure the voltage, a closed circuit must be provided, thus requiring a return conductor. If the same material were used for the return conductor, its temperature-generated voltage would cancel out the voltage of the first conductor. However, the voltage response is dependent upon the conductor itself. By using a dissimilar metal for the return conductor, a measurable voltage differential will be developed that is related to the temperature gradient experienced by both conductors.

Figure 1:
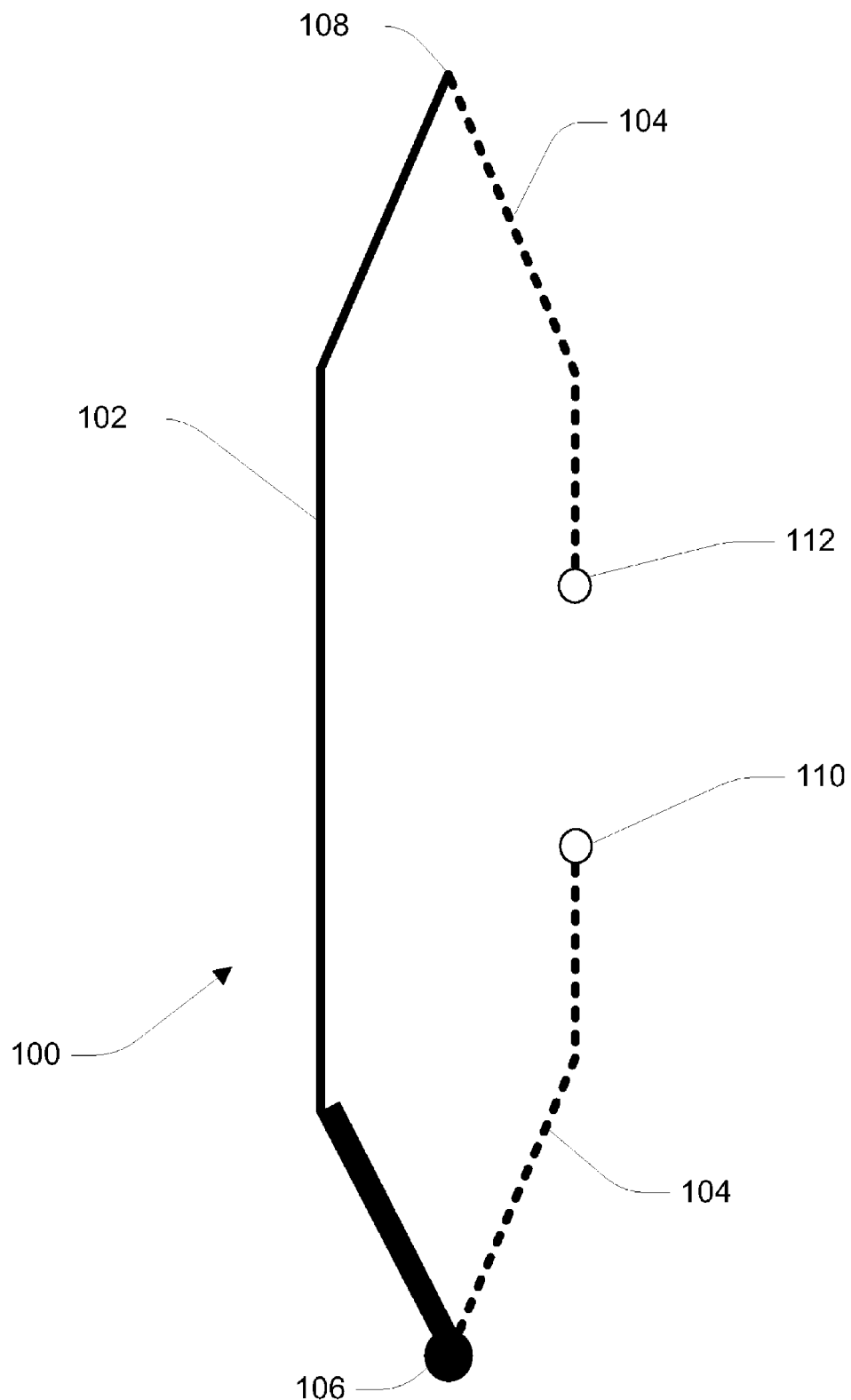
FIG. 1 is a schematic of a basic thermocouple design.

FIG. 1 is a schematic of a basic thermocouple design. The thermocouple 100 includes a first conductor 102 and second conductor 104. Two junctions 106 and 108 are formed where the two conductors are joined, and the voltage differential can be read across nodes 110 and 112. One junction, such as junction 106, is a measuring junction while the remaining junction, such as junction 108, is the reference junction.

Figure 2A:
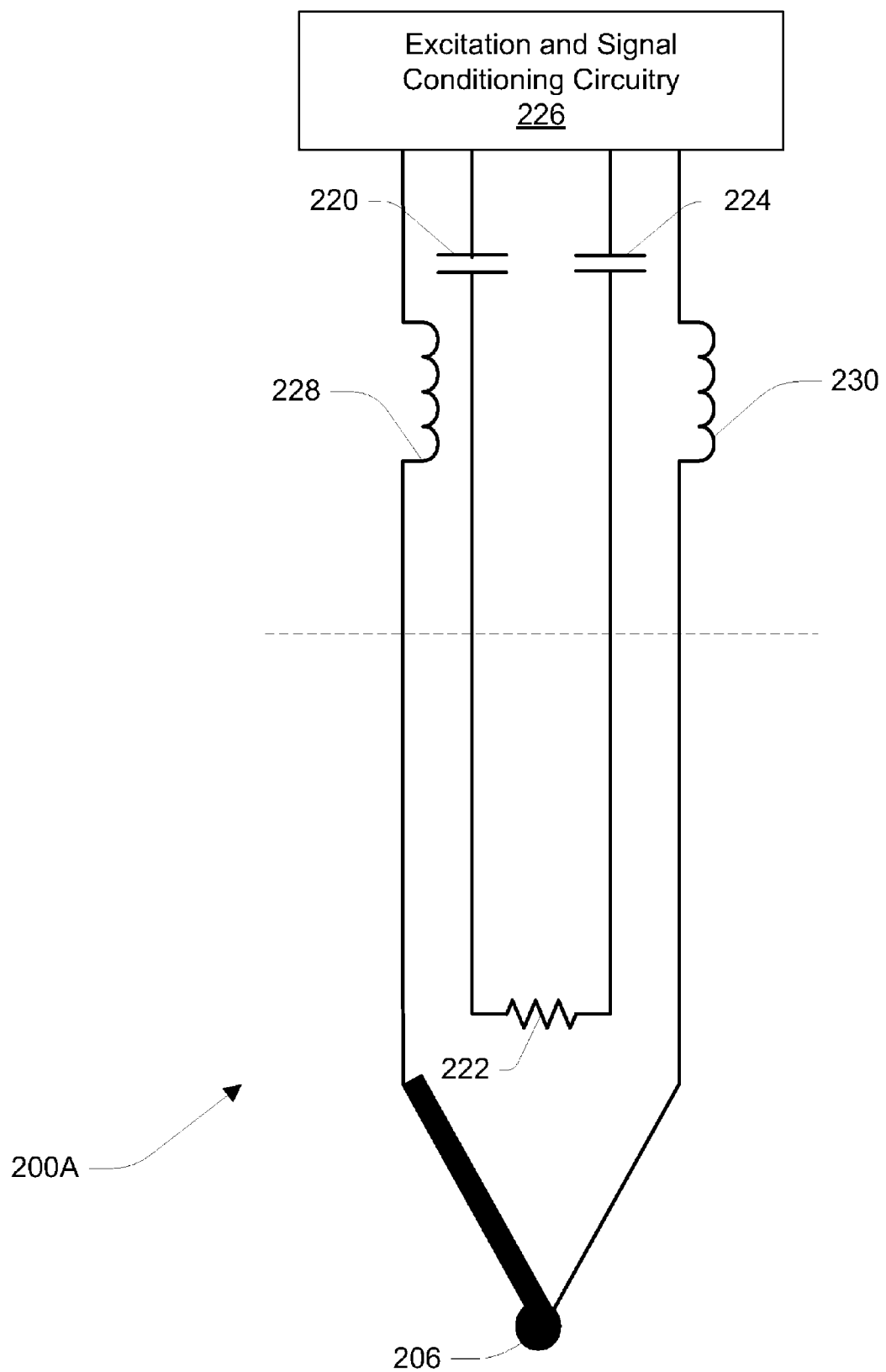
FIGS. 2A and 2B depict portions of two thermocouple circuits having measuring junction excitation elements for use with the various embodiments.
Figure 2B:
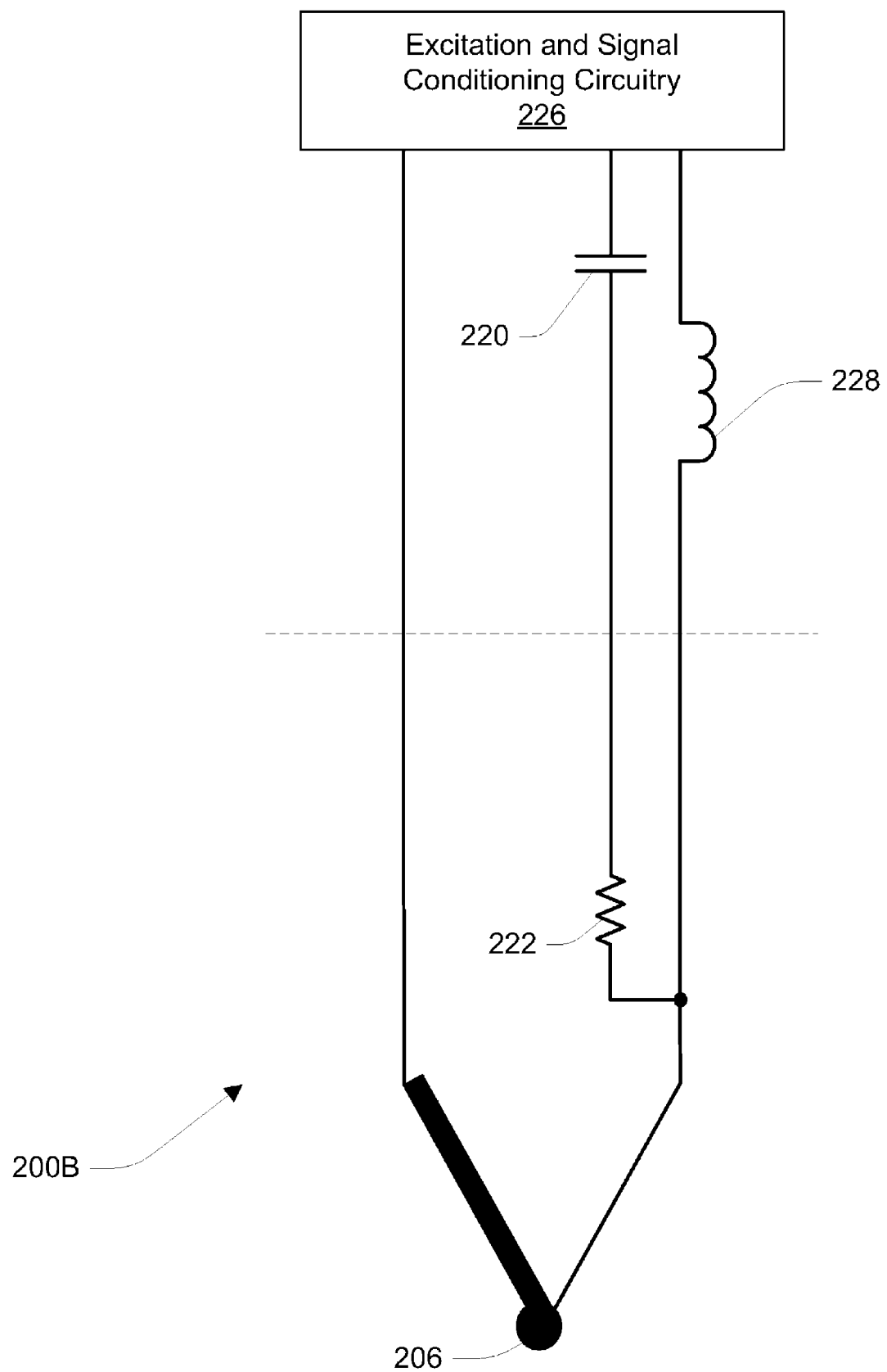

The various embodiments include a heating or excitation element at the measuring junction. FIGS. 2A and 2B depict portions of two thermocouple circuits 200A and 200B having measuring junction excitation elements for use with the various embodiments. In FIG. 2A, the thermocouple 200A includes a first capacitor 220, a resistor 222 and a second capacitor 224 coupled in series at the measuring junction 206. The thermocouple 200A further includes a first inductor 228 and a second inductor 230 coupled in series with the measuring junction 206. The resistor 222 acts as an excitation element. Elements located above the dashed line in FIG. 2A may generally be located on a circuit board of a thermocouple system while elements below the dashed line would be located at the sensing element. The excitation element 222 is in thermal contact with the measuring junction 206. That is, the excitation element 222 is sufficiently coupled to the measuring junction to cause a temperature rise in the measuring junction 206 upon application of the alternating current (AC) stimulation signal. The excitation element 222 need not be in physical contact, and may be separated by a thermal compound capable of thermal transfer.

By applying an AC signal from the excitation and signal conditioning circuitry 226, such as a pulse width modulated signal, to resistor 222 the measuring junction 206 will heat up. The AC stimulation signal, by itself, does not affect the thermocouple measuring junction 206 because inductors 228 and 230 act as an open circuit to the AC signal. In a similar manner, the DC voltage generated by the thermocouple will not affect the resistor 222 voltage since the capacitors 220 and 224 act as an open circuit to the DC signal. While two capacitors 220 and 224 and two inductors 228 and 230 are depicted in the embodiment of FIG. 2A, one capacitor and one inductor would suffice in that the path to the excitation element 222 could still act as an open circuit to a DC signal with one capacitor in the loop to the excitation and signal conditioning circuitry 226 and the path to the measuring junction 206 could still act as an open circuit to an AC signal with one inductor in the loop to the excitation and signal conditioning circuitry 226. Other circuit configurations can also be used to satisfy these criteria. For one embodiment, the same lead could be used to supply the AC signal to the resistor 222 and to read the measuring junction 206. For example, capacitor 220 and inductor 228 could both be coupled to a single lead in the excitation and signal conditioning circuitry 226, and capacitor 224 and inductor 230 could both be coupled to a single lead in the excitation and signal conditioning circuitry 226 such that a circuit path containing the resistor 222 would be coupled in parallel with a circuit path containing the measuring junction 206.

In FIG. 2B, the thermocouple 200B includes one inductor 228 coupled in parallel with series-coupled capacitor 220 and resistor 222 between the excitation and signal conditioning circuitry 226 and the measuring junction 206. The resistor 222 acts as an excitation element. Elements located above the dashed line in FIG. 2B may generally be located on a circuit board of a thermocouple system while elements below the dashed line would be located at the sensing element. The excitation element 222 is in thermal contact with the measuring junction 206. The excitation element 222 need not be in physical contact, and may be separated by a thermal compound capable of thermal transfer. For a further embodiment, the same lead could be used to supply the AC signal to the resistor 222 and to read the measuring junction 206. For example, capacitor 220 and inductor 228 could both be coupled to a single lead in the excitation and signal conditioning circuitry 226 such that a circuit path containing the resistor 222 would be coupled in parallel with at least a portion of a circuit path containing the measuring junction 206.

By applying an alternating current (AC) signal, such as a pulse width modulated signal, to resistor 222 the measuring junction 206 will heat up. The AC stimulation signal, by itself, does not affect the thermocouple measuring junction 206. In a similar manner, the DC voltage generated by the thermocouple will not affect the resistor 222 voltage since the capacitor 220 acts as an open circuit to the DC signal. Other designs may be utilized with the various embodiments, provided that the resulting excitation element provides one path inhibiting an AC signal and another path providing an open circuit to a DC signal. The embodiment of FIG. 2A adds improved noise immunity to the thermocouple circuit using a four-wire configuration while the embodiment of FIG. 2B reduces physical interfacing by using a three-wire configuration. As shown in FIG. 2B, a circuit path containing the resistor 222 may also include the measuring junction 206.

Thermocouples including excitation elements in accordance with embodiments of the invention are compatible with traditional thermocouple systems. Typical systems would provide instrumentation such as a cold junction compensator, signal conditioner circuitry, analog/digital (A/D) converter, processor, power section, and system interface, e.g., a universal serial bus (USB) interface or the like. However, the various embodiments would further include thermocouple excitation means and a pulse wave modulator (PWM).

Figure 3:
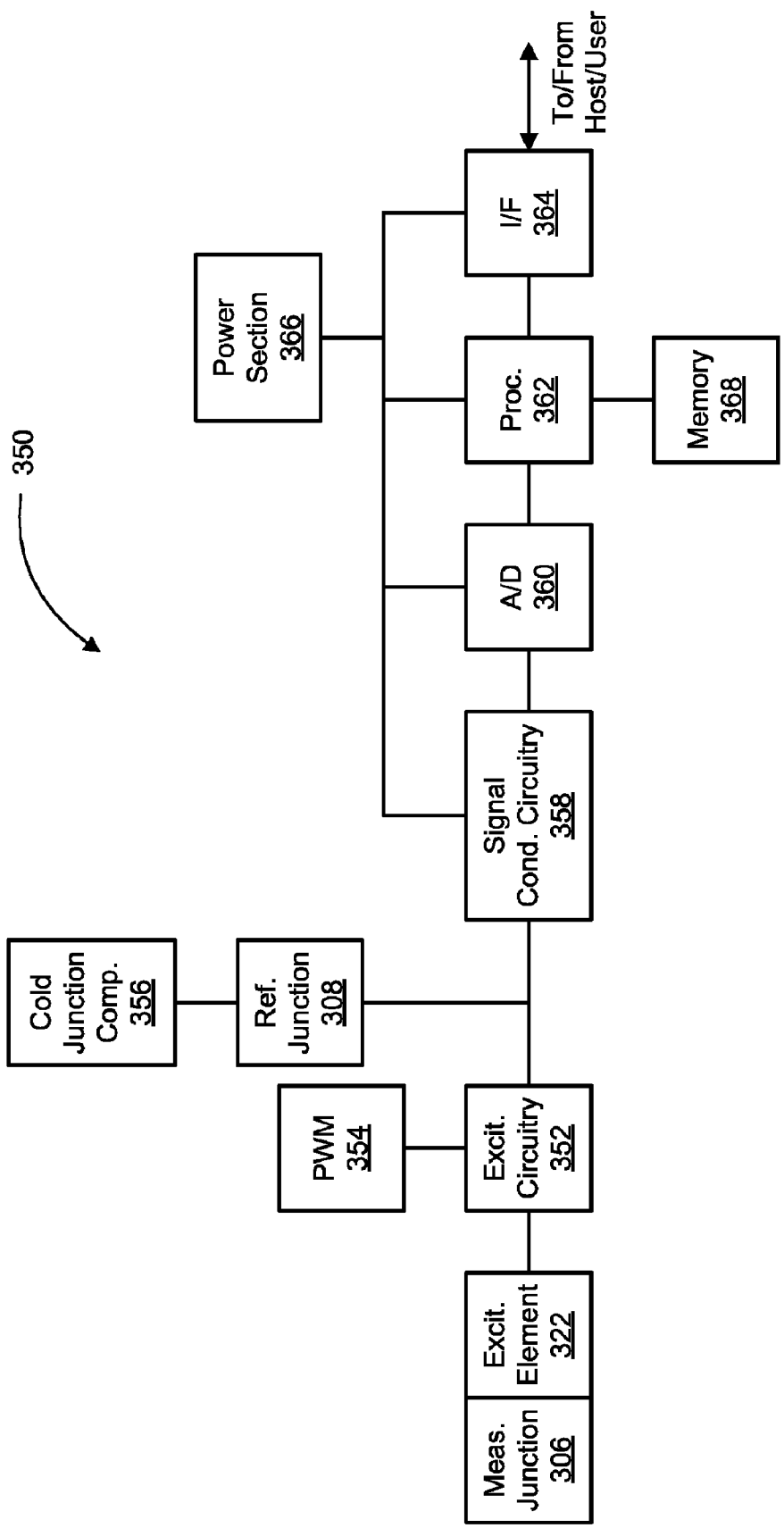
FIG. 3 is a block schematic of a thermocouple system in accordance with an embodiment of the invention.

FIG. 3 is a block schematic of a thermocouple system 350 in accordance with an embodiment of the invention. The thermocouple system includes a measuring junction 306 and reference junction 308. The measuring junction 306 includes an excitation element 322 in accordance with an embodiment of the invention. The excitation element 322 is coupled to receive an AC stimulation signal from PWM 354 through excitation circuitry 352. A cold junction compensator 356 and signal conditioner circuit 358 are coupled to receive the detected DC signal from the measuring junction 306. An A/D converter 360 is coupled to receive the compensated and conditioned signal and provide a digital signal representative of the expected temperature of the measuring junction 306 to the processor 362. Interface (I/F) 364 is coupled to the processor 362 to provide input/output (I/O) capabilities to receive commands at the processor 362 to perform various validation methods in accordance with the embodiments, and to provide data output of the detected temperature and of detected health of the system 350. Power section 366 may provide power to the various elements of the system 350. Alternatively, power may be received through the I/F 364.

A memory 368 may be included to store historical data on rise and/or decay times of the DC signal of the measuring junction 306 during validation. Preferably, the memory 368 is a non-volatile memory, such as flash memory or EEPROM (electrically erasable programmable read-only memory), so that historical data is retained in case of a power failure.

During operation of a self-validating thermocouple in accordance with the various embodiments, the following occurs.

Temperature measurement: The A/D converter measures the very small (µV to mV) voltage of the thermocouple and the cold junction compensators. Since the output voltage of the thermocouple is between µV and mV, it is generally necessary to use the internal gain of the A/D converter. The A/D converter also monitors the output of the cold junction compensator. Depending on the type of thermocouple used, the processor compensates the thermocouple output to obtain an accurate reading as is well understood in the art. The temperature may be calculated by using the following equation: $Ttip=A0+A1Vout+A2Vout^2+ \ldots +AnVout^n$. Alternatively, the temperature could be generated from a look-up table. Software in processor 362 can assist the user to operate in learning mode to automatically gather historical data of the thermocouple system during operation (monitoring and diagnostic mode). The user can also manually enter historical data.

Thermocouple Validation: To observe if the thermocouple is short or open, each differential line of the thermocouple is measured as being single ended to estimate the common mode. The leakage resistance of the capacitors of the AC-coupled PWM will either pull high or low any lead as the result of an open circuit. This condition can be detected by the processor, which then flags the condition as one of the failure modes. The thermocouple is slightly biased to have a common mode offset, which will change in the case of a short circuit. This condition can also be detected by the processor and flagged as another failure mode.

Bonding/Debonding Detection: Debonding of the thermocouple is evaluated based on a departure from a known thermal transfer function of the bonded system. When debonding occurs, the reduction in thermal mass translates into a different temperature rate of change, resulting in different rise and decay times. The processor sends a PWM excitation signal for the length of time needed to heat up the thermocouple. The difference in temperature (d[temp]/dt) and the time it takes to return to the original temperature before the excitation of the thermocouple indicates the health of the thermocouple and whether the thermocouple is bonded or debonded. For example, the thermocouple in a bonded condition will have faster decay in temperature, and thus detected DC voltage, than if it were in an unbonded condition. In addition, historical values of the rise and decay times can be compared with current values to indicate degradation of the thermocouple.

An operator may commence operation by selecting to start a diagnosis/monitoring sequence, wherein the PWM is used to estimate the time constants corresponding to the correct configuration. The user has the further option of using previous diagnostic values, which are stored in memory and readily available upon each commencement of operation.

Figure 4:
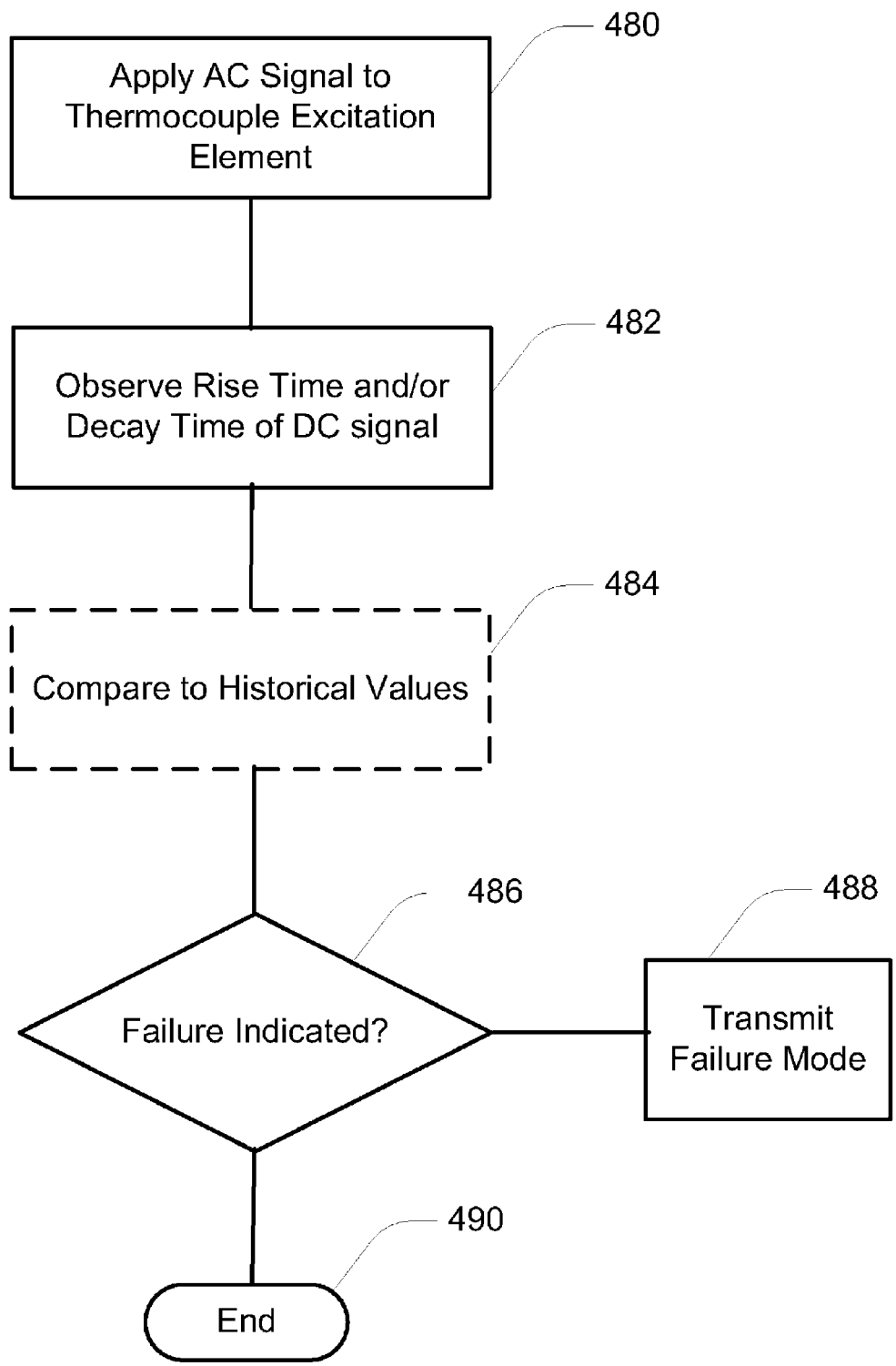
FIG. 4 is a flowchart of a method of validation in accordance with one embodiment of the invention.

FIG. 4 is a flowchart of a method of validation in accordance with one embodiment of the invention. The method of FIG. 4 may be initiated by an operator request, or the processor of the thermocouple system may be configured to periodically initiate the validation method, such as daily, weekly, or monthly. At 480, an AC excitation signal is applied to the thermocouple. At 482, the rise time and/or decay time of the DC signal of the thermocouple are observed. A thermocouple that is bonded to an object of interest, i.e., the object whose temperature is desired to be measured, will exhibit differing rise and decay times of its DC signal during and after, respectively, AC excitation. Optionally, the rise and/or decay times can be compared to historical data at 484. Historical comparisons can be especially useful in detecting degradation of the thermocouple measuring junction where trends in the times can be observed. Values that are trending in one direction or the other, as opposed to random variation, can be indicative of degradation of the thermocouple. This failure mode may be used to indicate a need for calibration, repair, or replacement.

If the raw observations for rise and/or decay times at 482, of the trend observations at 484, indicate a failure at 486, the resulting failure mode may be transmitted to the user or host system at 488. If no failure is indicated at 486, the validation may end at 490.

The Self-Validating Thermocouple (SVT) System in accordance with the various embodiments not only facilitate detection of open or short faults, but also facilitates identification of degradation of the thermocouple as well as its bonded or debonded state. The SVT system may provide signal conditioning and data acquisition capability in-situ to each thermocouple. It is capable of interfacing and processing signals from the most commonly used thermocouple types (J, K, E, and T) as well as other thermocouple types. The SVT can periodically evaluate the health of the thermocouple and the measurement capability. The circuit is capable of detecting failures and notifying the user/operator of the failure mode. The SVT may automatically provide a stream of data to be analyzed, or the SVT may respond to individual requests at any time, i.e., on demand.

SVTs in accordance with the various embodiments will be valuable for anyone using thermocouples as temperature sensors that require highly reliable measurements. The invention could allow elimination of the need for redundant thermocouple measurements which, in turn, translates into savings in operating and maintenance costs. Finally, the present invention facilitates increased failure detection capabilities as well as improved dating validity and reliability.

Although specific embodiments have been illustrated and described herein, it will be appreciated by those of ordinary skill in the art that any arrangement that is calculated to achieve the same purpose may be substituted for the embodiments shown. This application is intended to cover any adaptations or variations of the present invention. Therefore, it is manifestly intended that this invention be limited only by the claims and the equivalents thereof.

What is claimed is:

1. A thermocouple circuit, comprising:
   a reference junction; and
   a measuring junction;
   wherein the measuring junction is in thermal contact with an excitation element;
   wherein the measuring junction is located within a first circuit path inhibiting an alternating current signal;
   wherein the excitation element is located within a second circuit path providing an open circuit to a direct current signal; and
   wherein the second circuit path is coupled in parallel with at least a portion of the first circuit path.

2. A thermocouple circuit, comprising:
   a reference junction; and
   a measuring junction;
   wherein the measuring junction is in thermal contact with an excitation element;
   wherein the measuring junction is located within a first circuit path inhibiting an alternating current signal;
   wherein the excitation element is located within a second circuit path providing an open circuit to a direct current signal; and
   wherein the first circuit path comprises at least one inductor in series with the measuring junction.

3. The thermocouple circuit of claim 2, wherein the excitation element comprises a resistor.

4. The thermocouple circuit of claim 2, wherein the excitation element is in physical contact with the measuring junction.

5. The thermocouple circuit of claim 2, further comprising:
   wherein the second circuit path comprises at least one capacitor coupled in series with the excitation element.

6. The thermocouple circuit of claim 2, wherein the thermocouple circuit is of a J, K, E, or T type.

7. A thermocouple circuit, comprising:
   a reference junction; and
   a measuring junction;
   wherein the measuring junction is in thermal contact with an excitation element;
   wherein the measuring junction is located within a first circuit path inhibiting an alternating current signal;
   wherein the excitation element is located within a second circuit path providing an open circuit to a direct current signal; and
   wherein the first circuit path and the second circuit path share a first lead for reading the measuring junction and applying the alternating current signal to the excitation element.

8. The thermocouple circuit of claim 7, further comprising:
a first inductor coupled in series with the measuring junction; and
a first capacitor coupled in series with the excitation element.

9. The thermocouple circuit of claim 8, wherein the first inductor and the first capacitor are each coupled to the first lead.

10. The thermocouple circuit of claim 8, wherein the first inductor and the first capacitor are coupled in parallel.

11. The thermocouple circuit of claim 8, further comprising:
a second inductor coupled in series with the measuring junction and the first inductor; and
a second capacitor coupled in series with the excitation element and the first capacitor.

12. The thermocouple circuit of claim 11, wherein the second inductor and the second capacitor are each coupled to a second lead.

13. A thermocouple system, comprising:
a thermocouple circuit, wherein the thermocouple circuit comprises:
a reference junction; and
a measuring junction;
wherein the measuring junction is in thermal contact with an excitation element;
wherein the measuring junction is located within a first circuit path inhibiting an alternating current signal;
wherein the excitation element is located within a second circuit path providing an open circuit to a direct current signal; and
wherein the first circuit path comprises at least one inductor in series with the measuring junction;
a pulse wave modulator coupled to provide an alternating current signal to the excitation element;
a cold junction compensator and signal conditioner circuit coupled to receive a detected voltage signal from the thermocouple circuit and to provide a compensated and conditioned voltage signal;
an analog to digital converter coupled to receive the compensated and conditioned signal and provide a digital signal representative of an expected temperature of the measuring junction;
a processor coupled to receive the digital signal; and
an interface coupled to be processor to provide input/output.

14. A thermocouple system, comprising:
a thermocouple circuit, wherein the thermocouple circuit comprises:
a reference junction; and
a measuring junction;
wherein the measuring junction is in thermal contact with an excitation element;
wherein the measuring junction is located within a first circuit path inhibiting an alternating current signal;
wherein the excitation element is located within a second circuit path providing an open circuit to a direct current signal; and
wherein the first circuit path comprises at least one inductor in series with the measuring junction;
a pulse wave modulator coupled to provide an alternating current signal to the excitation element;
a cold junction compensator and signal conditioner circuit coupled to receive a detected voltage signal from the thermocouple circuit and to provide a compensated and conditioned voltage signal;
an analog to digital converter coupled to receive the compensated and conditioned signal and provide a digital signal representative of an expected temperature of the measuring junction;
a processor coupled to receive the digital signal; and
an interface coupled to be processor to provide input/output.

15. The thermocouple system of claim 14, further comprising a power section to provide power to the various elements of the thermocouple system.

16. The thermocouple system of claim 14, wherein the second circuit path comprises at least one capacitor in series with the excitation element.

17. The thermocouple system of claim 14, wherein the thermocouple circuit is of a J, K, E, or T type.

18. The thermocouple system of claim 14, further comprising a memory coupled to the processor.

19. The thermocouple system of claim 18, wherein the memory is a non-volatile memory.

* * * * *